Aug. 20, 1946.                R. E. MEYER                2,406,092
                AUXILIARY EYESHIELD AND WELDING HOOD
                        Filed Feb. 13, 1943
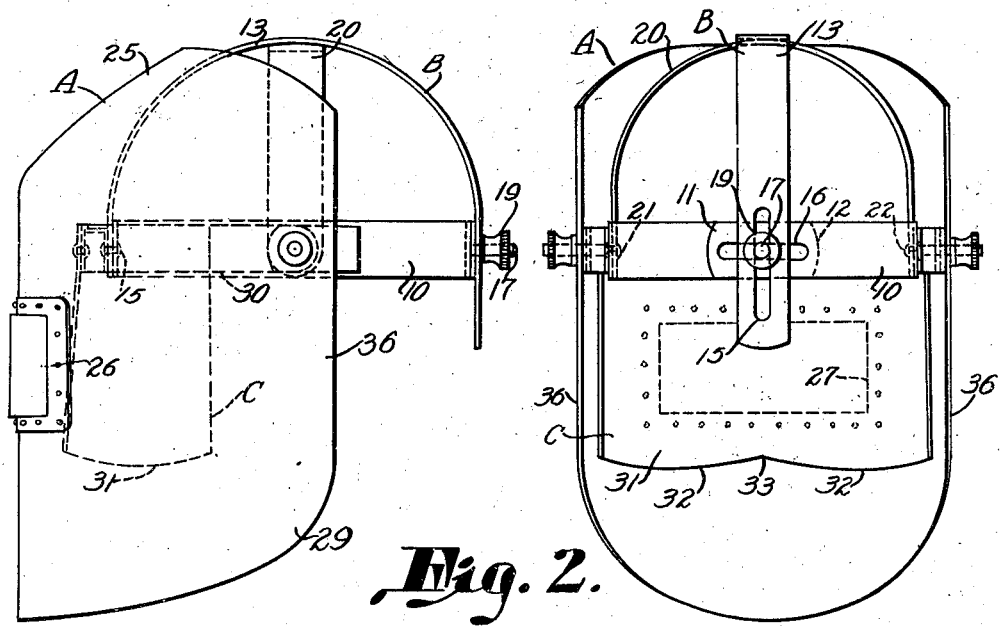
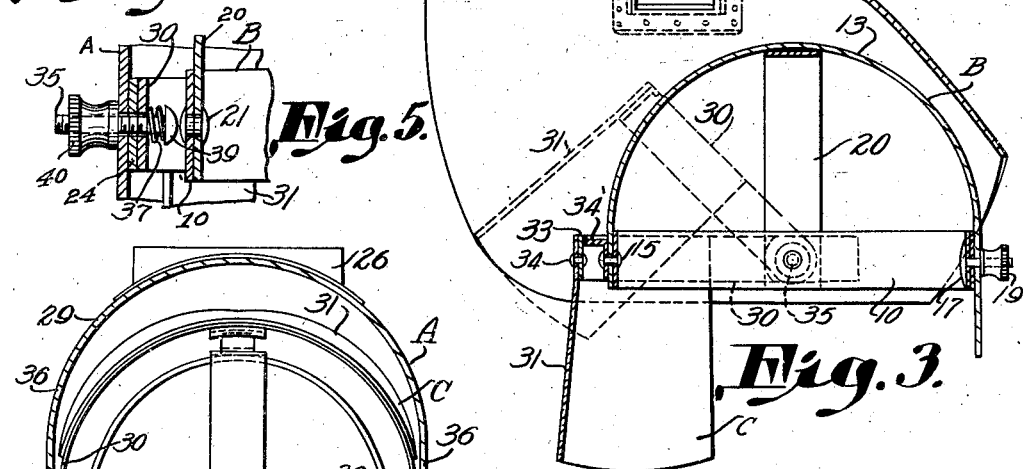
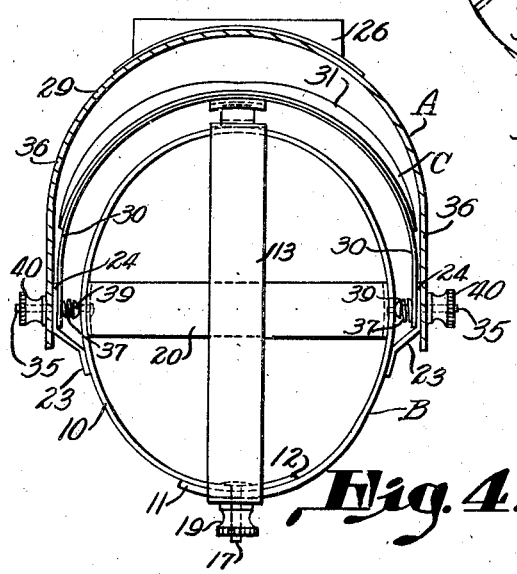
Inventor:
ROGER E. MEYER
By Robert M. Dunning
Attorney Patented Aug. 20, 1946

2,406,092

UNITED STATES PATENT OFFICE 2,406,092

AUXILIARY EYESHIELD AND WELDING HOOD

Roger E. Meyer, St. Paul, Minn.

Application February 13, 1943, Serial No. 475,751

4 Claims. (Cl. 2—8)

My invention relates to an improvement in auxiliary eye shield and welding hood, wherein it is desired to provide an auxiliary protection for the eyes for use when a welding helmet is pivoted into inoperative position.

In the use of a welding helmet or hood, it is common practice to pivot the hood into operative position during the actual welding operation and then to swing the hood out of operative position when the actual welding operation is not taking place. Thus while scale is being chipped from the work between welding operations, the welding hood is usually in inoperative position and does not form a protection for the eyes of the wearer.

Attempts have been made to produce welding helmets capable of providing clear vision so that these helmets will be worn throughout the entire operation. Because of the necessity of making the glass of the hood of a type which will prevent the intense light from injuring the eyes, however, it has been difficult to produce a helmet which will provide effective vision when the welding torch is turned off or put aside. Therefore it has usually been necessary to swing the welding hood out of operative position while the material is being prepared for further welding operations.

I have found that in chipping the particles of scale from a surface to be welded between welding operations some of this scale is extremely apt to injure the eyes of the welder. It is inconvenient to take off the welding helmet and to put on an eye shield between welding operations, and to do so would require considerable time and effort. Therefore, rather than to protect the eyes between welding operations, it is usual practice to take a chance that the small particles of scale will not injure the eyes during the scaling operation.

It is the object of the present invention to provide a welding hood with an auxiliary eye shield which is normally in place over the eyes and which will remain in protecting position when the welding hood is swung into inoperative position. As a result the scaling operation may readily take place with the welding hood tilted out of protecting position without danger of injury to the eyes. As the particles of scale ordinarily do not travel at an intense rate of speed there is little danger of injury to other exposed parts of the body, it being mainly necessary to prevent these scale particles from entering the eyes.

A feature of the present invention lies in the provision of a harness designed to fit over the head and the pivotal attachment to this harness of both a welding hood and an auxiliary eye shield. The welding hood pivots independently of the eye shield so that it may be tilted back into inoperative position without changing the position of the eye shield.

A further feature of the preferred form of my invention lies in the provision of a harness having an eye shield and a welding hood pivotally attached thereto. As a result the welding hood may be pivoted into an inoperative position and similarly the eye shield can be pivoted out of operative position if it is so desired.

A feature of the present invention resides in the provision of a welding helmet having a restricted sight opening therethrough and an auxiliary eye shield separately mounted beneath the hood which provides a relatively unrestricted view. Therefore, while the welding hood provides the necessary protection from the intense glare of the welding torch the auxiliary eye shield will not greatly impair the vision of the welder when the hood is in inoperative position.

A further feature of the present invention lies in the fact that the eye shield forms a protection to the eyes of the welder in case the sight window in the helmet becomes broken. For example, should the glass of the hood sight window be shattered, tending to spread particles of glass on the inside of the hood, the eye shield will protect the eyes from this glass. The eye shield is preferably formed of transparent plastic or the like, which will not readily shatter or break in the manner of glass.

A further feature of the present invention lies in the provision of a cooperable means between the harness and the eye shield to prevent pivotal movement of the eye shield beyond a limited position. As a result the eye shield is prevented from pivoting into contact with the face or nose of the welder, and at the same time will protect the eyes of the welder from welding slag and scale being chipped from the objects being welded.

These and other objects and novel features of my invention will be more clearly and fully set forth in the following specification and claims.

In the drawing forming a part of my specification:

Figure 1 is a side elevational view of my combined welding hood and eye shield showing the construction thereof.

Figure 2 is a rear elevational view of the hood and eye shield illustrated in Figure 1.

Figure 3 is a vertical sectional view similar to

Figure 1 showing the welding hood swung into inoperative position and showing in dotted outline an intermediate position of the eye shield when swung into inoperative position.

Figure 4 is a top plan view of the combined welding hood and eye shield, a portion of the upper part of the welding hood being broken away in order to better show the construction and arrangement of parts.

Figure 5 is a sectional view of a pivotal attachment between the harness, the welding hood, and the eye shield.

The welding hood A is designed for support by a harness B which also acts to support the eye shield C. The harness B pivotally supports the welding shield and also pivotally supports the eye shield so that either may be individually pivoted with respect to the harness.

The harness B may be of any suitable type and is preferably adjustable to fit the head of the welder. The harness B is shown including a strap 10 of plastic, metal, or other suitable material and is shown with overlapping ends 11 and 12 which are secured in overlapping relation, preferably at the rear of the harness. A supporting strap 13 is secured at its front end by means of a rivet 15 or other suitable means to the strap 10 which is intended to encircle the head of the welder laterally. The strap 13 is designed to extend over the center of the top of the head and is slotted at 15, as best illustrated in Figure 2 of the drawing near the rear end thereof. Slots 16 are provided in one or both of the ends 11 and 12 of the strap 10 so as to permit adjustment of the length of the strap 10 to properly encircle the head of the welder. A bolt 17 or other suitable attaching means extends through the ends 11 and 12 of the strap 10 and through the slot 15 of the strap 13 holding these parts in adjusted relation. The manner in which the length of the band 10 and the length of the strap 13 may be adjusted is believed obvious from an examination of Figure 2 of the drawing. A thumb nut 19 or other securing means normally holds these parts of the harness in adjusted relation and may be loosened for changing the adjustment.

An additional strap 20 is designed to extend over the head from side to side, being terminally connected at 21 and 22 to the laterally extending band 10. This strap 20 may be adjustably connected to the strap 10 if it is so desired, but in the form of construction illustrated the ends of the strap 20 are riveted directly to the strap 10. Obviously if it is so desired the strap 20 may comprise two separate straps overlapping at the top and being adjustable in this manner if it is desired.

A pair of clips 23 are secured to opposite sides of the band 10 and these clips 23 are provided with an off-set end portion 24 extending substantially parallel to the adjacent portion of the band 10 from which the off-set portions are spaced. These clips 23 are designed to support the welding helmet A and the eye shield C in a manner which will be later described in detail.

The welding hood or helmet A may be of any desired shape or conformation, being substantially trough-shaped in lateral section and having a rearwardly inclined upper protecting portion 25. A frame 26 of metal or similar material is secured to the forward surface of the hood A and a shield 27 of transparent or translucent material is provided in this frame 26. The shield 27 is usually formed of heat resistant transparent material which will dim the high glare of the burning torch and which will not be readily injured by heat.

The hood A includes a relatively rigid body 29 which retains its general shape in use and which may be pivotally supported by the harness B. The material of which the hood A is formed is not important in the present invention and any type of material suitable for the purpose may be employed. Similarly the specific shape of the hood and the formation of the sight window is not important and any accepted form of construction may be used for these parts.

The eye shield C is formed as best illustrated in Figures 1, 2, and 3 of the drawing. A supporting band 30 is pivotally connected to opposite sides of the harness B, as will be later pointed out, and the transparent body 31 of the shield is secured marginally to the band 30 and depends therefrom. The band 30 may be integral with the shield 31 if the entire device is made of plastic, or the plastic shield may be secured to the band 30 in the manner illustrated. The specific shape of the shield may be varied, but the shield is shown with downwardly projecting cheek portions 32 and a slight notch 33 between the same as best illustrated in Figure 2 of the drawing.

A substantially L-shaped catch 33 is secured in inverted position by means of a rivet 34 or other suitable means to the band 30 and to the upper marginal edge of the shield 31. This catch 33 is designed to engage a cooperable angularly shaped catch 34' secured in inverted position to the forward end of the harness by suitable means such as by the rivet 15 connecting the bands 10 and 13 of the harness. The engagement of the catch 33 with the cooperable catch 34' limits downward pivotal movement of shield body 31. However, as indicated in dotted outline in Figure 3 of the drawing, the eye shield may pivot upwardly out of protecting position when it is so desired.

In order to pivotally attach the eye shield C and the welding hood A to the harness B, I provide pivot bolts 35, best illustrated in Figures 4 and 5 of the drawing. The band 30 preferably extends inwardly of the off-set portion 24 of the brackets or clips 23, while the sides 36 of the body 29 of the welding hood A extends externally of these off-set portions 24. Springs 37 are preferably provided between the heads 39 of the pivot bolts 35 and the band 30, while adjusting nuts 40 are threaded on the bolts 35 externally of the welding hood A. By tightening or loosening the nuts 40 the tension of the springs 37 may be increased or decreased so that pivotal movement between the harness, the eye shield, and the welding hood may be adjusted.

It will be noted that the welding hood A may be pivoted into inoperative position in the usual manner by swinging the hood upwardly about the pivot bolts 35. As is shown in Figure 3 of the drawing the eye shield C normally remains in operative position after the hood A has been pivoted into inoperative position. Thus the eye shield is in position to protect the eyes while at the same time providing a clear vision of the work so that the welder may readily remove scale and slag from the object or objects being welded without danger of injury to the eyes. However, if it is so desired the eye shield C may also be pivoted into inoperative position as indicated in dotted outline in Figure 3 of the drawing.

In accordance with the patent statutes, I have described the principles of construction and operation of my auxiliary eye shield and welding hood, and while I have endeavored to set forth the best embodiment thereof, I desire to have it understood that obvious changes may be made within the scope of the following claims without departing from the spirit of my invention.

I claim:

1. A combined welding hood and eye shield comprising a harness designed to fit the head of a welder, opposed clips secured to said harness, a welding hood, an eye shield including arms extending into proximity with said opposed clips, and pivot means supported by said clips extending through said clips, said arms, and said welding hood, said clips embracing said pivot means between said arms and said hood to independently pivotally connect said eye shield and welding hood to said harness, said hood and said shield being pivotal into position above said harness.

2. A combined welding hood and eye shield comprising a harness designed to fit the head of a welder, opposed clips on said harness, an eye shield including arms projecting into engagement with said clips, a welding hood extending over said clips, pivot means supported by said clips extending through said arms, said clips, and said welding hood, said clips embracing said pivot means between said arms and said hood to independently pivotally attach said eye shield and said welding hood to said clips, said hood and said shield being pivotal into position above said harness, and resilient means on said pivot means urging the arms and the hood against said clips for resisting pivotal movement between the pivotally attached elements.

3. A combined welding hood and eye shield comprising a harness designed to fit the head of a welder, opposed clips secured to said harness, an arcuate band pivotally secured at opposite ends to said clips, an arcuate eye shield secured to said band, a welding hood pivotally secured to said clips, said hood and said shield being pivotal into position above said harness, pivots supported by said clips extending through said band, said clips, and said hood to pivotally connect said band and hood to said clips, said clips acting to space said band and hood apart.

4. A combined eye shield and welding hood including a harness designed to fit the head, a pair of clips secured to opposite sides of said harness, a welding hood, an arcuate eye shield supporting band pivotally secured at opposite ends to said clips, pivots supported by said clips extending through said band, said clips, and said hood to pivotally connect these elements, said hood and said shield being pivotal into position above said harness, said clips acting to space the band from the hood, and resilient means between one end of each said pivot and the adjacent pivoted element urging said band and hood against said clips.

ROGER E. MEYER.